(12) United States Patent
DeLuca et al.

(10) Patent No.: US 10,748,180 B2
(45) Date of Patent: Aug. 18, 2020

(54) RELATIONSHIP MANAGEMENT SYSTEM FOR USER DEVICES

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 15/423,180

(22) Filed: Feb. 2, 2017

(65) Prior Publication Data

US 2018/0218396 A1    Aug. 2, 2018

(51) Int. Cl.
*G06Q 30/02*    (2012.01)
*H04L 29/08*    (2006.01)
*G06Q 50/00*    (2012.01)

(52) U.S. Cl.
CPC ......... *G06Q 30/0251* (2013.01); *H04L 67/22* (2013.01); *H04L 67/306* (2013.01); *G06Q 50/01* (2013.01)

(58) Field of Classification Search
CPC ..... G06Q 30/0251; G06Q 50/01; H04L 67/22
See application file for complete search history.

(56) References Cited

U.S. PATENT DOCUMENTS

| | | | |
|---|---|---|---|
| 7,474,617 B2 | 1/2009 | Molen et al. | |
| 7,690,036 B2* | 3/2010 | Fitzgerald | G06F 21/316 |
| | | | 709/225 |
| 8,205,790 B2* | 6/2012 | Pennella | G06F 21/31 |
| | | | 235/375 |
| 8,438,270 B2 | 5/2013 | Nappier et al. | |
| 8,661,119 B1 | 2/2014 | Jindal et al. | |
| 9,069,947 B2* | 6/2015 | Kottahachchi | G06F 21/45 |
| 9,256,761 B1* | 2/2016 | Sahu | G06F 16/21 |
| 9,513,958 B2* | 12/2016 | Jones | G06F 9/46 |
| 2011/0162047 A1* | 6/2011 | Reeves | G06F 21/33 |
| | | | 726/4 |
| 2013/0067062 A1 | 3/2013 | Gaitonde et al. | |
| 2014/0136333 A1* | 5/2014 | Shoshitaishvili | H04L 67/22 |
| | | | 705/14.66 |
| 2015/0012433 A1* | 1/2015 | Yang | G06Q 20/227 |
| | | | 705/44 |
| 2016/0098644 A1 | 4/2016 | Hua et al. | |

* cited by examiner

*Primary Examiner* — Colleen A Hoar
(74) *Attorney, Agent, or Firm* — Yee & Associates, P.C.

(57) ABSTRACT

A method, system, and computer program product for managing relationships based on device logins. The method comprises detecting a login pattern for a first user account and a second user account from a user device and identifying a relationship between the first user account and the second user account based on the login pattern.

16 Claims, 4 Drawing Sheets

RELATIONSHIP MANAGEMENT SYSTEM FOR USER DEVICES

BACKGROUND

1. Field

The present disclosure relates generally to an improved computer system, and more specifically, to a method and apparatus for identifying relationships between user accounts. Still more particularly, the present disclosure relates to a method and apparatus for managing relationships for user accounts based on login patterns from a user device.

2. Description of the Related Art

In promoting goods and services, organizations may generate advertisements, make recommendations, or perform other actions. For example, in promoting an item, such as a good or service, an organization may generate an advertisement for the item, make suggestion to purchase or use the item, or perform some other action.

In making these promotions, many organizations seek to obtain information about potential customers to promote items to those potential customers. Users commonly access the Internet to obtain information, communicate with other people, make purchases, or perform other actions. Obtaining information about access by users provides the organizations information about potential customers.

For example, with a social media network, an organization may obtain information about users of the social media network to promote items. An organization may obtain information about likes that a first user has made for an item, such as a car. That information may be used to promote the item to a second user who is a friend of the first user on the social media network. Identifying these relationships is useful in promoting items.

Although relationships identified through social media networks and other sources is one manner in which promotion of items may be made, it would be desirable to have additional mechanisms to promote items.

SUMMARY

An embodiment of the present disclosure provides for a method, system, and computer program product for managing relationships based on device logins. The method comprises detecting a login pattern for a first user account and a second user account from a user device and identifying a relationship between the first user account and the second user account based on the login pattern. The system comprises a relationship monitoring system comprising a computer system and a login detector. The login detector in the computer system detects a login pattern for a first user account and a second user account from a user device and identifies a relationship between the first user account and the second user account based on the login pattern. The computer program product is a computer program product for identifying relationships based on device logins. The computer program product comprises a first program code, stored on a computer-readable storage media for detecting a login pattern for a first user account and a second user account from a user device and a second program code, stored on the computer-readable storage media for identifying a relationship between the first user account and the second user account based on the login pattern.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments however, as well as the preferred mode of use, further objectives and features thereof, will be best understood by reference to the following detailed description of an illustrative embodiment of the present disclosure when read in conjunction with the accompanying drawings, wherein;

DETAILED DESCRIPTION

Figure 1:
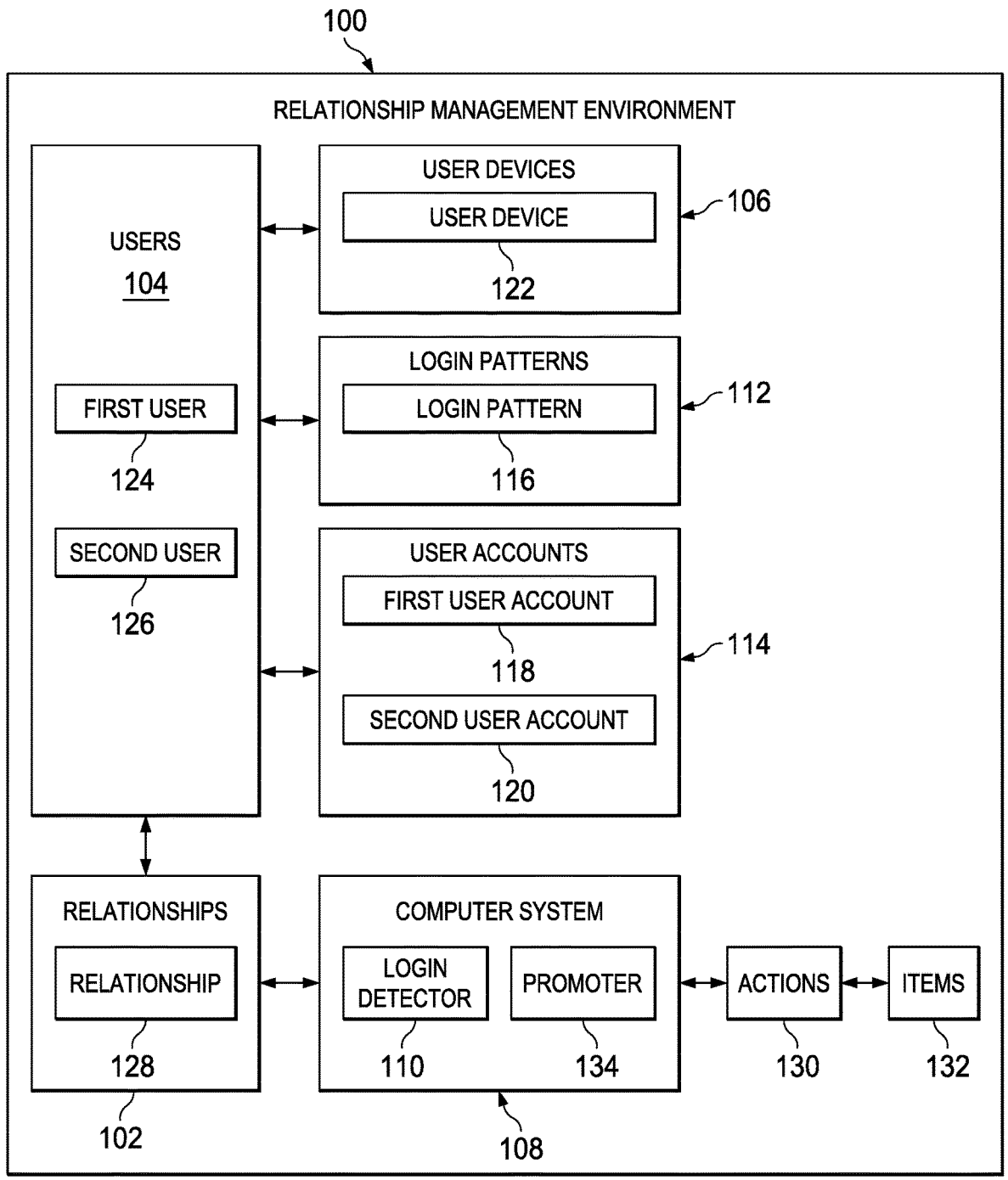
FIG. 1 is a block diagram of a relationship management environment in accordance with an illustrative embodiment.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction processing device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer readable-program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an internet service provider). In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or other programmable data processing apparatus to produce a machine, such that the instructions, which are processed via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions or acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more program instructions for implementing the specified logical function or functions. In some alternative implementations, the functions noted in the blocks may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take into account that user accounts on a device may have relationships. The illustrative embodiments recognize and take into account that identifying these relationships may aid in managing these relationships. For example, the illustrative embodiments recognize and take into account that managing relationships may include identifying and offering services for users. The illustrative embodiments recognize, however, that currently available techniques for managing relationships between users are not present. The illustrative embodiments recognize and take into account that identifying relationships between users based on their user accounts is not available in a desired manner for managing the relationships between the users.

With reference now to the figures and, in particular, with reference to FIG. 1, a block diagram of a relationship management environment is depicted in accordance with an illustrative embodiment. In this illustrative example, relationship management environment 100 is an environment in which relationships 102 to may be identified between users 104 of user devices 106.

As depicted, computer system 108 with login detector 110 may manage relationships 102 between users 104. This management includes detecting relationships 102 between users 104 of user devices 106. As depicted, relationships 102 may be detected based on login patterns 112 made by users 104 to user accounts 114 for user devices 106. The login made by users 104 may be to at least one of a service, a website, a local user account, a program, or other processes or systems that users 104 may log into with user accounts.

In this illustrative example, login detector 110 detects login pattern 116 for first user account 118 and second user account 120 both from user device 122 in user devices 106 as part of managing relationships 102. In this depicted example, first user account 118 is for first user 124 in users 104 and second user account 120 is for second user 126 in users 104. Login pattern 116 is a pattern of logins to first user account 118 and second user account 120 made from user device 122 in this illustrative example.

As depicted, user device 122 is a physical data processing system in these illustrative examples. The physical data processing system may be selected from one of a desktop computer, a laptop computer, a tablet computer, a mobile phone, a smart watch, a set-top box, a game console, or some other type of device that includes a processor unit.

With the detection of login pattern 116, login detector 110 identifies relationship 128 between first user account 118 and second user account 120 based on login pattern 116 into these user accounts. In this example, second user account 120 may have been the account that was previously logged in on user device 122 prior to first user account 118.

With relationship 128, a group of actions 130 may be performed to promote a group of items 132. As used herein, a "group of," when used with reference to an item, means one or more items. For example, a group of actions 130 is one or more of actions 130, and a group of items 132 is one or more of items 132. In the illustrative example, the relationship identified is a relationship between first user 124 and second user 126 based on first user account 118 and second user account 120.

The group of actions 130 for the group of items 132 may be performed by promoter 134. Promoter 134 may be selected from a group comprising a program, a service, or some other component in computer system 108. In this manner, the group of actions 130 may be selected and performed based on knowing relationship 128 between first user 124 and second user 126.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Login detector 110 may be implemented in software, hardware, firmware, or a combination thereof. When software is used, the operations performed by login detector 110 may be implemented in program code configured to run on hardware, such as a processor unit. When firmware is used, the operations performed by login detector 110 may be implemented in program code and data and stored in persistent memory to run on a processor unit. When hardware is employed, the hardware may include circuits that operate to perform the operations in login detector 110.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Computer system 108 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

In one illustrative example, one or more technical solutions are present that overcome a technical problem for managing relationships based on device logins. As a result, one or more technical solutions may provide a technical effect of identifying information about relationships between users of the same user device. With identifying relationships between users, the relationships identified may be managed by performing different actions based on the relationships between the users.

As a result, computer system 108 operates as a special purpose computer system in which login detector 110 in computer system 108 enables managing relationships 102 based on device logins. In particular, login detector 110 transforms computer system 108 into a special purpose computer system, as compared to currently available general computer systems that do not have login detector 110.

Figure 2:
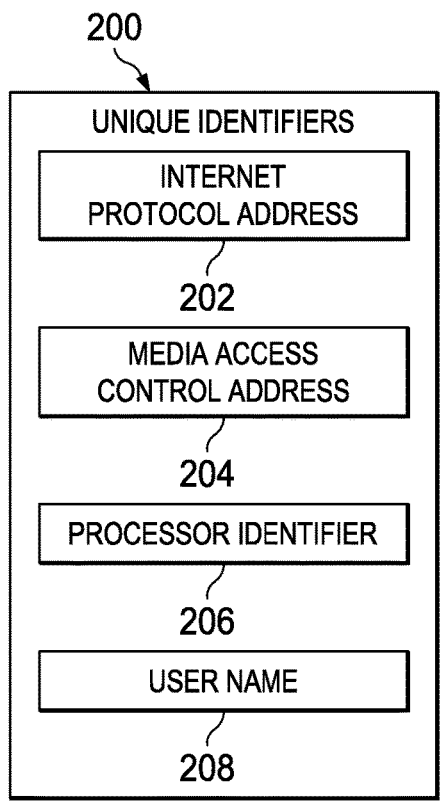
FIG. 2 is a block diagram of unique identifiers for detecting a login from a user device in accordance with an illustrative embodiment.

With reference next to FIG. 2, a block diagram of unique identifiers for detecting a login from a user device is depicted in accordance with an illustrative embodiment. This process may be implemented in program code, hardware, or some combination thereof on the user device, such as user device 122 in FIG. 1. In the illustrative example, the user device may take various forms selected from at least one of a mobile application, a website, a user device, or an operating system on the user device The detection of first user 124 for logging into first user account 118 and second user 126 logging into second user account 120 on user device 122, shown in FIG. 1, may be detected in a number of different ways. In particular, one or more of unique identifiers 200 may be used. In this illustrative example, unique identifiers 200 include Internet protocol (IP) address 202, media access control (MAC) address 204, processor identifier 206, and user name 208.

These different unique identifiers in unique identifiers 200 are some examples of mechanisms that may be used to identify when logins from different user accounts occur at the same user device. For example, in detecting the login from first user account 118 and second user account 120 from user device 122, the login from first user account 118 and second user account 120 from user device 122 may be made through at least one of internet protocol (IP) address 202, media access control (MAC) address 204, processor identifier 206, or user name 208.

Figure 3:
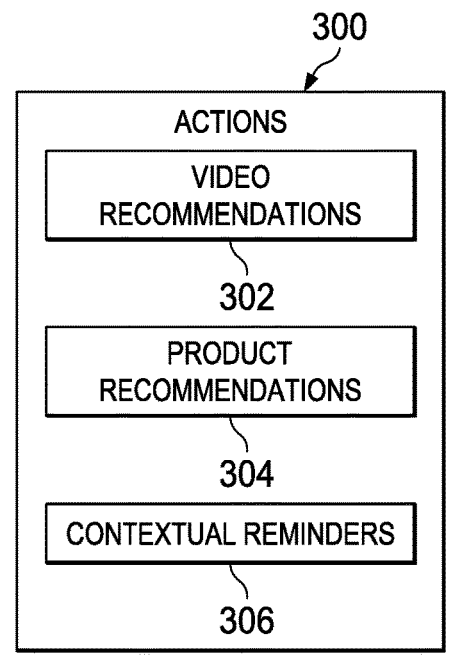
FIG. 3 is a block diagram of actions that may be taken using relationships identified between users in accordance with an illustrative embodiment.

Turning now to FIG. 3, a block diagram of actions that may be taken using relationships identified between users is depicted in accordance with an illustrative embodiment. In this illustrative example, actions 300 are examples of actions 130 in FIG. 1.

As depicted, actions 300 may take various forms. In this illustrative example, actions 300 comprise video recommendations 302, product recommendations 304, and contextual reminders 306.

Video recommendations 302 may be made for streaming video services. For example, two users may be considered to have a relationship from logging into different user accounts for the same video streaming service. In this manner, the identification of the relationship between the two users may be used to provide better recommendations on individual streaming video accounts for the users. These recommendations may be especially useful if the user is identified as having similar tastes in shows or movies.

In this illustrative example, product recommendations 304 may be made between users. For example, product recommendations 304 may be made based on the relationship between users. For example, an analysis may be made of the user accounts or other sources, such as social media, to identify similar interests between the users in making product recommendations.

As depicted, contextual reminders 306 may be used to provide reminders with respect to users that have relationships to each other. For example, a first user may be reminded about the birthday for a second user. In another example, a reminder may be made about an anniversary between two users.

These examples are provided to illustrate some of the types of actions 300. Examples of other types of actions 300 include, for example, shopping deals, recommending gifts based on what the recipient has looked at, suggesting events that the first user and the second user may be interested in attending, suggesting friends, or other types of actions 300.

The illustration of relationship management environment 100 and the different components in relationship management environment 100 in FIGS. 1 and 2 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, shown in FIG. 1, promoter 134 may be located in a computer system other than computer system 108 in some illustrative examples. In another illustrative example, login detector 110 may be integrated as part of promoter 134. As another example, the relationship between users 104 may be performed for more than two users. For example, a third user may be identified through a login through a third user account on user device 122, in addition to a login using first user account 118 and second user account 120. As another example, other unique identifiers may be used in addition to or in place of the ones shown in FIG. 2. For example, a device identifier, a serial number, or other types of unique identifiers also may be used.

Figure 4:
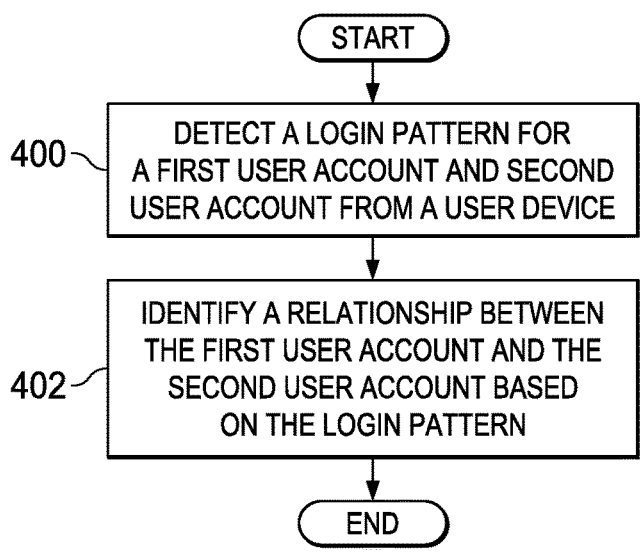
FIG. 4 is a flowchart of a process for managing relationships based on device logins in accordance with an illustrative embodiment.

Turning next to FIG. 4, a flowchart of a process for managing relationships based on device logins is depicted in accordance with an illustrative embodiment.

The process begins by detecting a login pattern for a first user account and second user account from a user device (step 400). In step 400, the process may detect the login pattern from the first user account and the second user account from the user device through an internet protocol address, a media access control address, or a processor identifier.

The process then identifies a relationship between the first user account and the second user account based on the login pattern (step 402). The process terminates thereafter.

Some examples of login patterns include identifying that only certain users login from a particular computer or device. This type of pattern may indicate that the users are family members. The times of day when logins occur is another type of login pattern. Also, actions always performed by user A before user B logs in is an example of another login pattern that may be identified in determining relationships between users. Further, if user A logs in 90 percent of the time, user A is most likely the owner of the device. If user B logs in to the device 8 percent of the time, user C logs in 1 percent of time, and user D logs in 1 percent of the time, this pattern may indicate that user B has a closer relationship to user A than to user C or user D.

Figure 5:
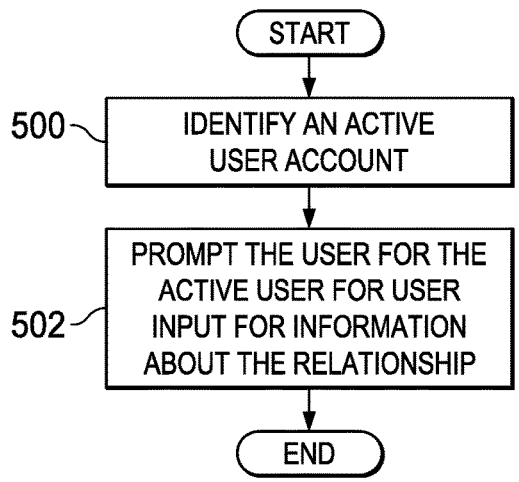
FIG. 5 is a flowchart of a process for identifying a relationship between user accounts in accordance with an illustrative.

With reference to FIG. 5, a flowchart of a process for identifying a relationship between user accounts is depicted in accordance with an illustrative embodiment. The process illustrated in FIG. 5 is an example of one of the implementations for step 402 in FIG. 4.

The process begins by identifying an active user account (step 500). The process prompts the user for the active user for user input for information about the relationship (step 502). The process terminates thereafter.

Figure 6:
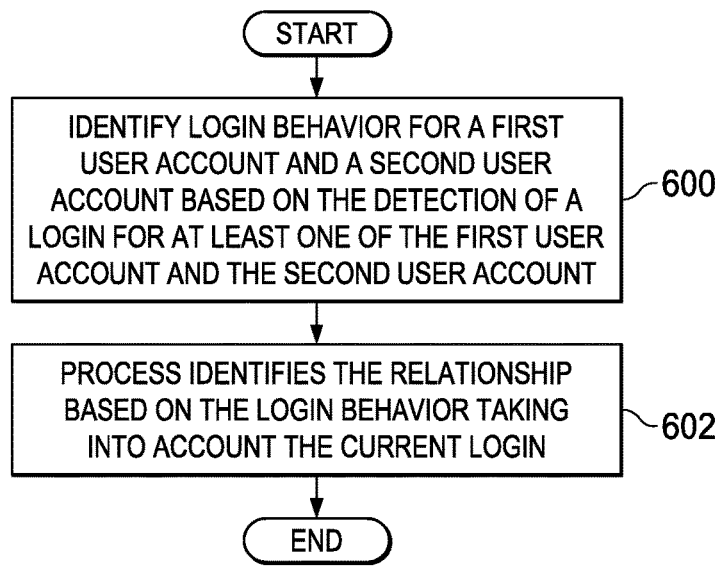
FIG. 6 is a flowchart of a process for identifying a relationship between user accounts in accordance with an illustrative embodiment.

With reference to FIG. 6, a flowchart of a process for identifying a relationship between user accounts is depicted in accordance with an illustrative embodiment. The process illustrated in FIG. 6 is an example of one of the implementations for step 402 in FIG. 4.

The process begins by identifying login behavior for a first user account and a second user account based on the detection of a login for at least one of the first user account and the second user account (step 600). Detecting the login behavior includes at least one of identifying the location of the user device, a time of when login occurred, a frequency of prior logins, and other suitable types of information.

The process identifies the relationship based on the login behavior taking into account the current login (step 602). The process terminates thereafter.

Figure 7:
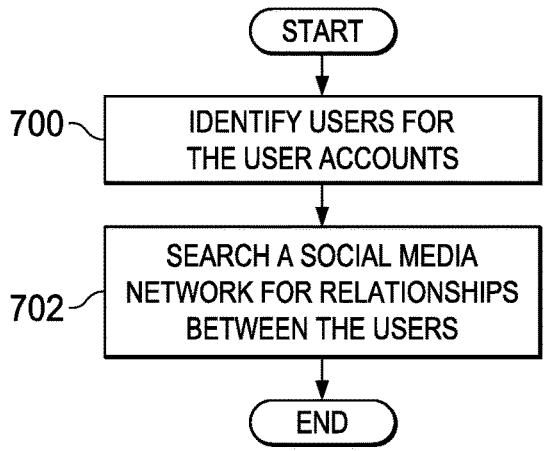
FIG. 7 is a flowchart of another process for identifying a relationship between user accounts in accordance with an illustrative embodiment.

With reference to FIG. 7, a flowchart of a process for identifying a relationship between user accounts in accordance with the most embodiment. The process illustrated in FIG. 7 is an example of one of the implementations for step 402 in FIG. 4.

The process begins by identifying users for the user accounts (step 700). The users may be identified from a database or log of user accounts and users for the user accounts. For example, if the login is to a user account for an online retail store, a database of users and user accounts for the online retail store may be accessed to identify the users. Another example, if the login is for users on the user device, the user accounts may be identified from access controls for users and user accounts on the user device.

The process that searches a social media network for relationships between the users (step 702). The process terminates thereafter. For example, the process may search to see whether the users are on each other's friends list, if the users name each other as having relationships, the amount commenting on each other's pages, or other suitable sources of information on the social media network. The relationship may be characterized by type and level. For example, the type may be friend, relative, sibling, spouse, co-worker, significant other, or some other type of relationship. The level may be, for example, 1 to 5, with 5 being the highest level.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
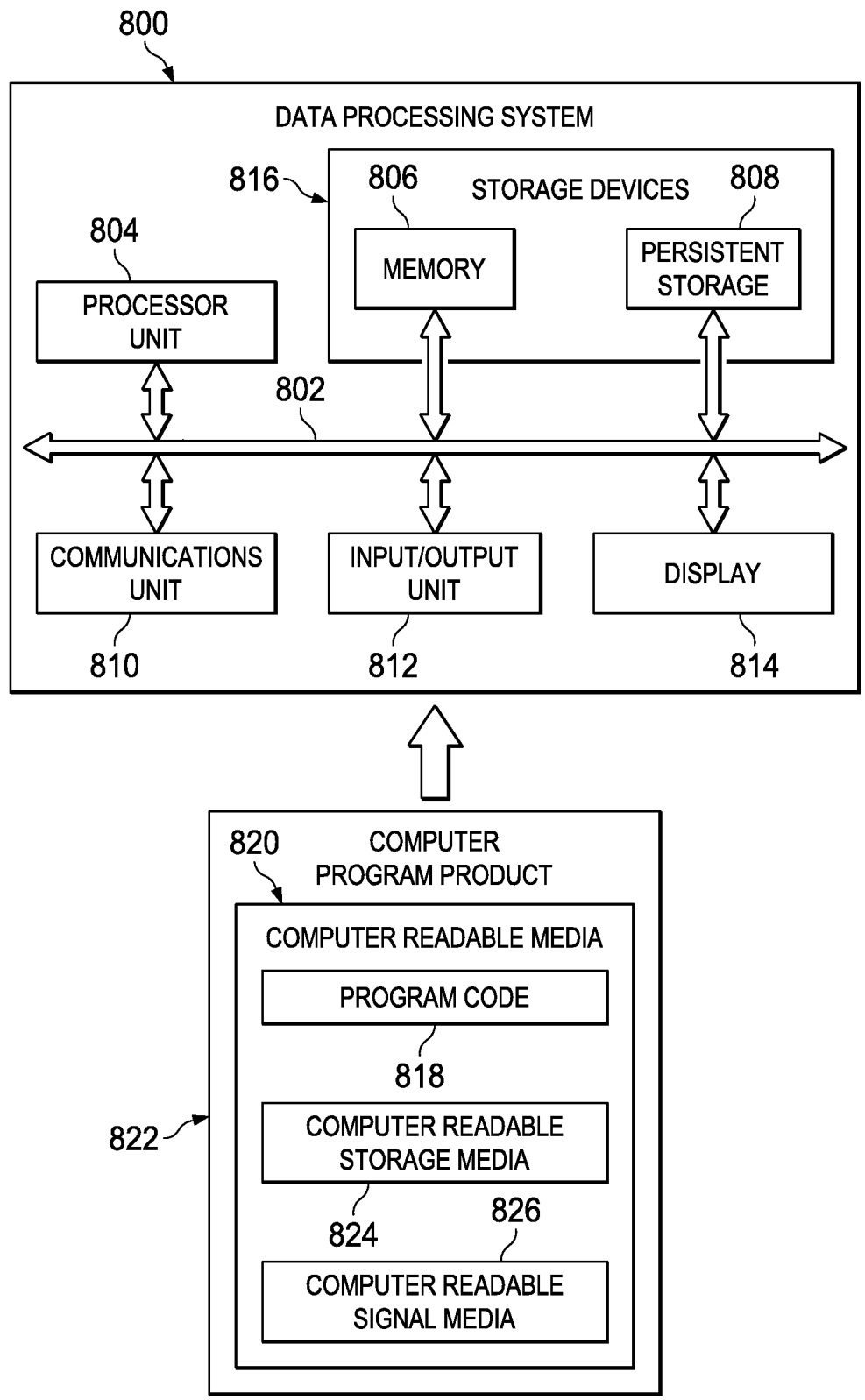
FIG. 8 is a block diagram of a data processing system in accordance with an illustrative embodiment.

Turning now to FIG. 8, a block diagram of a data processing system is depicted in accordance with an illustrative embodiment. Data processing system 800 may be used to implement computer system 108 and user devices 106 in FIG. 1. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to process instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and run by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for processing by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, illustrative embodiments of the present invention provide a computer implemented method, computer system, and computer program product for managing relationships based on device logins. The process detects a login pattern for a first user account and second user account from a user device. The process also identifies a relationship between the first user account and a second user account based on the login pattern. The identification of the relationship between user accounts identifies relationships between users of the user accounts With the relationship identified, the process may take various actions. For example, the process may generate advertising directed to at least one of the first user account and the second user account based on the relationship identified. As another example, the process may generate a contextual reminder for at least one of the first user account and the second user account based on the relationship identified. In still another example, the process may generate video recommendations directed to at least one of the first user account and the second user account based on the relationship identified.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more program instructions for implementing the specified logical function or functions. It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for managing relationships based on device logins, the method comprising:
    detecting a login pattern for a first user account and a second user account from a user device;
    identifying a relationship between the first user account and the second user account based on the login pattern;
    generating and providing to the user device advertising directed to at least one of the first user account and the second user account based on the relationship identified; and
    generating and providing to the user device a contextual reminder for at least one of the first user account and the second user account based on the relationship identified.

2. The method of claim 1 further comprising:
    generating video recommendations directed to at least one of the first user account and the second user account based on the relationship identified.

3. The method of claim 1, wherein identifying the relationship between the first user account and the second user account based on the login pattern comprises:
    prompting for user input for information about the relationship.

4. The method of claim 1, wherein identifying the relationship between the first user account and the second user account based on the login pattern comprises:
    monitoring login behavior for the first user account and the second user account on the user device.

5. The method of claim 1, wherein detecting the login pattern for the first user account and the second user account from the user device comprises:
    detecting the login pattern for the first user account and the second user account from the user device through an internet protocol address, a media access control address, or a processor identifier.

6. The method of claim 1, wherein the detecting and identifying steps are performed on at least one of a mobile application, a website, the user device, or an operating system on the user device.

7. A relationship monitoring system comprising:
    a computer system; and
    a login detector in the computer system that detects a login pattern for a first user account and a second user account from a user device, identifies a relationship between the first user account and the second user account based on the login pattern, generates and provides to the user device advertising directed to at least one of the first user account and the second user account based on the relationship identified, and generates and provides to the user device a contextual reminder for at least one of the first user account and the second user account based on the relationship identified.

8. The relationship monitoring system of claim 7, wherein the computer system generates video recommendations directed to at least one of the first user account and the second user account based on the relationship identified.

9. The relationship monitoring system of claim 7, wherein in identifying the relationship between the first user account and the second user account based on the login pattern, the login detector prompts for user input for information about the relationship.

10. The relationship monitoring system of claim 7, wherein identifying the relationship between the first user account and the second user account based on the login pattern, the login detector monitors login behavior for the first user account and the second user account on the user device.

11. The relationship monitoring system of claim 7, wherein in detecting a login for the first user account and the second user account from the user device, the login detector detects the login for the first user account and the second user account from the user device through an internet protocol address, a media access control address, or a processor identifier.

12. The relationship monitoring system of claim 7, wherein the login detector is located on at least one of a mobile application, a website, the user device, or an operating system on the user device.

13. A computer program product for identifying relationships based on device logins, the computer program product comprising:

a computer-readable storage media;
a first program code, stored on the computer-readable storage media, for detecting a login pattern for a first user account and a second user account from a user device;
a second program code, stored on the computer-readable storage media, for identifying a relationship between the first user account and the second user account based on the login pattern;
third program code, stored on the computer-readable storage media, for generating and providing to the user device advertising directed to at least one of the first user account and the second user account based on the relationship identified; and
fourth program code for generating and providing to the user device a contextual reminder for at least one of the first user account and the second user account based on the relationship identified.

14. The computer program product of claim 13, wherein the second program code comprises:
program code, stored on the computer-readable storage media, for prompting for user input for information about the relationship.

15. The computer program product of claim 13, wherein the second program code comprises:
program code, stored on the computer-readable storage media, for monitoring login behavior for the first user account and the second user account on the user device.

16. The computer program product of claim 13, the second program code comprises:
program code, stored on the computer-readable storage media, for detecting a login for the first user account and the second user account from the user device through an internet protocol address, a media access control address, or a processor identifier.

* * * * *